United States Patent [19] [11] 3,729,581

Anderson [45] Apr. 24, 1973

[54] COMPUTER ASSISTED DIAL ACCESS VIDEO RETRIEVAL FOR AN INSTRUCTIONAL TELEVISION SYSTEM

[75] Inventor: Deyrol E. Anderson, St. Paul, Minn.

[73] Assignee: Display Systems Corporation, St. Paul, Minn.

[22] Filed: Sept. 3, 1970

[21] Appl. No.: 69,312

[52] U.S. Cl. ..............178/6.8, 178/DIG. 22, 178/5.8, 340/147 R, 340/171

[51] Int. Cl. ..........................H04n 7/18

[58] Field of Search ..................178/DIG. 22, 5.6, 178/5.8; 340/147, 171; 325/37, 55, 64

[56] References Cited

UNITED STATES PATENTS

| | | | |
|---|---|---|---|
| 3,098,119 | 7/1963 | Lemelson | 178/DIG. 22 |
| 3,569,937 | 3/1971 | Heatter | 178/5.8 |
| 3,084,213 | 4/1963 | Lemelson | 178/DIG. 22 |
| 2,457,149 | 12/1948 | Herbst | 340/147 R |
| 3,449,720 | 6/1969 | Marino | 340/147 R |
| 2,812,509 | 11/1957 | Phelps | 340/147 R |

*Primary Examiner*—Robert L. Griffin
*Assistant Examiner*—Joseph A. Orsino, Jr.
*Attorney*—Cameron, Kerkam & Sutton

[57] ABSTRACT

An instructional television system is provided for making available non-print learning materials upon request. The instructional system includes a central library store for storage of programs of learning materials. Learning materials are selectively transmitted via a TV transmitter link after being addressed with a predetermined three variable (tone, duration and period of silence) code. The code serves to "unclock" or activate one or more decoders disposed at a plurality of subscriber stations through a TV receiver at the corresponding subscriber station. Each decoder at a subscriber station can be programmed to any one of a plurality of two-tone sequential codes. The activated encoder serves to actuate an associated video tape recorder to record the selected transmitted material after which all remote subscriber video tape recorders previously activated by the coded transmission signal are deactivated.

10 Claims, 6 Drawing Figures

INVENTOR
DEYROL E. ANDERSON

BY *Cameron, Kerkam & Sutton*
ATTORNEYS

INVENTOR
DEYROL E. ANDERSON

BY Cameron, Kerkam & Sutton
ATTORNEYS

Patented April 24, 1973 3,729,581

5 Sheets-Sheet 3

INVENTOR

DEYROL E. ANDERSON

BY *Cameron, Kerkam & Sutton*

ATTORNEYS

INVENTOR
DEYROL E. ANDERSON

BY
Cameron, Kerkam & Sutton
ATTORNEYS

INVENTOR

DEYROL E. ANDERSON

BY Cameron, Kerkam & Sutton

ATTORNEYS

COMPUTER ASSISTED DIAL ACCESS VIDEO RETRIEVAL FOR AN INSTRUCTIONAL TELEVISION SYSTEM

BACKGROUND OF THE INVENTION

With the advent and continual improvement in quality of programs available for instructional purposes, more and more educational institutions are relying on educational television programming to supplement their teaching programs. However, because of differences in timing schedules within educational system, it is difficult to program available recorded material into established schedules.

The newer concepts of individualized instruction, such as team teaching, pyramid curriculum, control, inquiry and sensitivity methodologies being introduced into elementary levels of education are threatening the self-contained classroom to such an extent, that educational television as it is known today is rapidly becoming incompatible with existing curriculum. It is becoming virtually impossible to schedule programs during the few available teaching hours, without disrupting the individual instruction process.

It has been recognized that the only feasible solution to retaining audio/visual support to supplement current instructional techniques is to devise some means by which the users of television and other support media can maintain absolute control over not only what materials are to be developed, but over the day and time such materials are to be used in learning process. In other words, in the case of educational television, the viewer must in effect be able to maintain control of the transmitter, so that the viewer can select the transmitted message and the time when the message is to be transmitted. It is to this problem that the present invention is addressed.

In attempt to meet the demands posed by new methods of instruction, school systems throughout the country have resorted to computers, dial access and remote control devices, tape recorders, educational TV and other educational devices to supplement their teaching programs. Unfortunately, the teaching hardware purchased has often been found to be incompatible with the type selected in adjacent school districts. As a result, exchange of production or learning materials between districts is blocked and only a limited amount of instructional material is available to each district within their budgetary limitations. The new system of flexible schedules and other teaching methods used to encourage the individual learning process has caused an upheaval in the concept of traditional self-contained classrooms even at the elementary level. Greater and greater emphasis on individualized instruction has limited the value of conventional educational television systems. The limited time available during the teaching hours is insufficient to present a wide range of production materials, and as a result, many educational television systems as known today are educationally impotent. Further, as previously noted, the daily schedules and routines of many schools are not right for taking advantage of programs broadcast at specific hours during the day.

In accordance with the present invention, these and other disadvantages of prior art educational display systems are overcome and a system is provided which enables the user at a receiver to maintain control of a video presentation.

Another object of the present invention is to provide an improved selective signalling system for the remote control of video tape recorders, and more particularly to provide a system wherein an aural carrier of a television station is used to control activation and deactivation of remote video tape recorders.

Another object of the present invention is to provide an improved control unit that will respond to a sequence of tone frequencies to activate a video tape recorder through a conventional TV monitor receiver.

Still another object of the present invention is to provide an improved control unit that responds to a particular sequence of tone frequencies to activate a video tape recorder, and after a transmitted program is taped, to deactivate the video tape recorder to its standby condition.

These and other objects and the attendant advantages will become readily apparent from the following description; however, the invention, both as to organization and method of operation, may be best understood by reference to the description taken in conjunction with the accompanying drawings. In the drawings, wherein like reference characters identify like parts throughout the several views.

Figure 1:
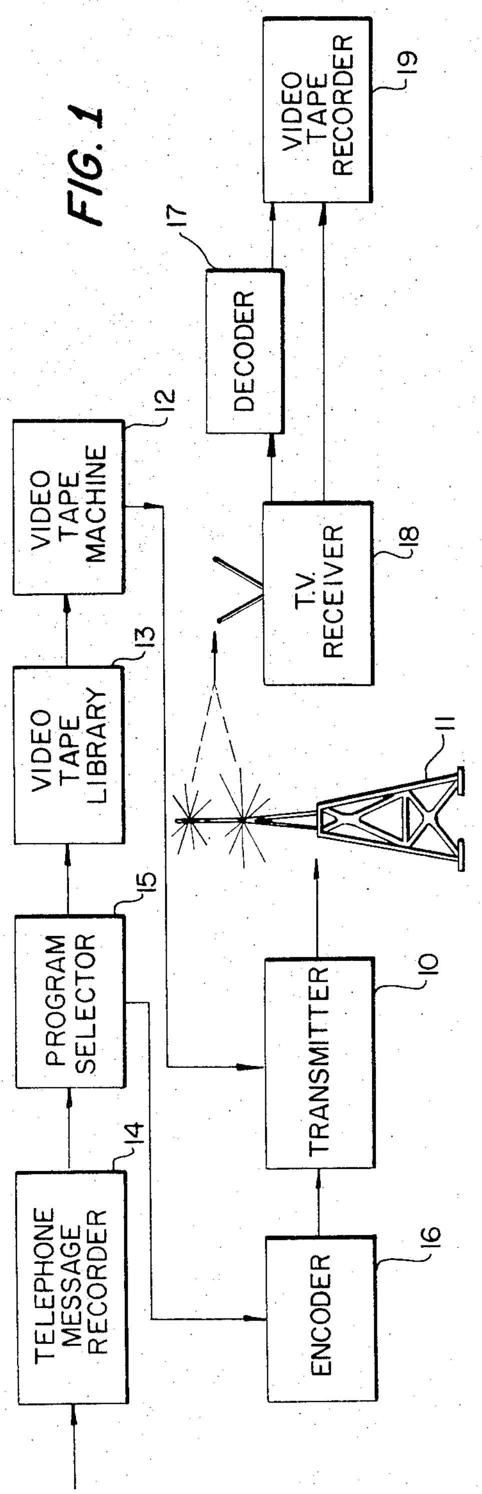
FIG. 1 is an overall system block diagram of the present invention.

Referring now to the drawings, and in particular to FIG. 1, there is illustrated a video retrieval system embodying the present invention which may comprise any number of subscriber stations within receiving distance of a standard television station designated by transmitter 10 and antenna 11.

Any number of pretaped educational programs ready for video presentation through a video tape machine 12 and transmitter 10 are maintained in a suitable store designated as the video tape library 13. Selection of a video tape for transmission may be initiated by a request entered into telephone message recorder 14 which is connected to the program selector 15. Thus, where each prerecorded video tape is assigned a particular code, a particular tape may be selected by a telephone initiated (dialed) coded message, the operations of program selection and transmission being controlled by a general purpose computer which serves as the program selector. The output of the program selector, in addition to initiating a tape selection request to the video tape library 13, also activates encoder 16 which modulates the aural carrier of TV transmitter 10 with a two-tone selective calling signal and a single-tone deactivating signal.

The two-tone selective calling signal provides the optimum method for remotely controlling video tape recorders in terms of cost and flexibility since it is readily adapted for use with existing commercial equipment available to many educational institutions and permits incorporation of existing hardware into the instructional television system embodying the present invention with a minimum of additional equipment and modifications. To this end, in the transmitting system only an encoder 16 is needed to provide the two-tone code and deactivating signal, while in the receiving system, a decoder 17 is provided between receiver 18 and video tape recorder 19 for controlling retrieval of the transmitted program. The transmitted program is received through a conventional television receiver 18 having its audio output section connected to decoder 17. In this way, the aural carrier of the transmitter provides the code signals to the decoder for activation and deactivation thereof. The video tape recorder is energized after a short time delay to allow the rotating recording head to come up to its operating speed after which the transmitted video program passed through the r.f. output section of the TV receiver is recorded on the tape. The video tape recorder is connected to the television receiver in a conventional manner.

While the system is advantageously adapted for computer assisted dial access video retrieval, the economics of installation of a computerized system may prohibit utilization of such a system in tax supported educational institutions. In such a situation, resort may be made to a manually assisted arrangement wherein a station engineer at the central transmitting station performs the functions of interrogating the recorder, selecting requested programs from the tape library, scheduling programs where several requests for programs have been recorded, loading and operating the video tape machine, selecting the proper subscriber code and activating and deactivating the selected encoders from the central station.

Operation of such a manually assisted system is as follows. A subscriber request which may be from any one of the operating personnel of an educational institution, is instituted by scanning a catalog listing of program materials stored in the library. Any one or more of the specific program materials may be ordered for transmission by telephone connected by land lines to a conventional telephone message recorder 14 which stores the request. Each subscribing station is assigned a particular code and the request identifies that subscribing station. After the request has been made, the person making the request insures that the receiving equipment is tuned and the decoder is in a standby condition. Normally, since only a single educational channel is being used, the receiver is constantly in a tuned condition. This completes the activities of the subscriber.

As should be readily apparent, various participating recipients or subscribers throughout the coverage pattern of the TV station may have also requested this same instructional material or additional instructional material and all such requests are recorded at the TV station on the telephone message recorder. These requests may be made throughout the day, and at the end of the business day, the recorder is interrogated.

The program material is scheduled for transmission after conclusion of the normal broadcast schedule of the TV station. Of course, a program could be broadcast immediately, but to facilitate use of specific requests for particular groups of learners, it is more desirable to the learning institutions to have a predetermined scheduling arrangement which provides access to the materials for several users over the coverage pattern of a TV station and which enables economic utilization of existing transmitters. This is best accomplished by broadcasting after conclusion of the normal broadcast schedule.

Prior to transmission of a specific selection, the TV station engineer selectively activates particular video tape recorders at one or more remote stations by selecting a predetermined code and operating the encoder 16 located at the TV station. The requested program is then transmitted, after which the remote recorders previously activated are deactivated by a reset tone control initiated by the station engineer using the same encoder equipment.

The two-tone selective calling system provides the most efficient and lowest cost alternative for remotely controlling video tape recorders. Other methods of accomplishing a similar function are either too costly for intended users, or inadequate in terms of overall flexibility.

Selection of a predetermined code and accuracy of addressing is accomplished by the depressing pushbuttons arranged on the front panel of the encoder which in turn activates tones on a precise frequency which is pre-set. Frequency discrimination is with an accuracy of 0.015 cycles within a possible range of 217.3 cycles or between 321.7 cps and 539.0 cps. Such finite discrimination can yield up to 10,000 discrete combinations of tones without "falsing" or decaying through cross-talk or spurious signalling.

A second variable employed to insure system's reliability is the length of time each generated tone is permitted to transmit. Duration is measured in microseconds and a pulse either too long or too short will not properly excite the decode mechanism.

A third variable to the system is the period of silence between the two generated tones. Again, the silence period is measured in micro-seconds. Should the second tone not appear at the precise interval and on its precise frequency, the decoder will not function.

Each of these three variables must fall one upon the other in a pre-set sequence in order to "unlock" or activate the proper decoder. These three system's "protections" or variables make a virtually error-free combination against any spurious signal affecting the operation of the field unit decoders. Furthermore, each decoder is equipped with the possibility of easily changing the coding address to any one of twenty combinations. This provides flexibility which enables groups of decoders to be activated, or all decoders, if the need arises, can be called simultaneously as well as the activation of individual units, as is the typical operation. Such address changing or grouping can be accomplished by simply adding available desired wires to an internally placed terminal strip in a decoder which sets the tone sensitivity or coding of that particular encoder.

From the encoder, an individual call is initiated by two pulses of one tone each. Each pulse is approximately one second long with a 0.2 second space between pulses. Preferably, however, the second tone may be slightly less than one second. A reset call is initiated by one pulse of one tone which is manually timed and all decoders respond to the same reset tone signal.

Figure 2:
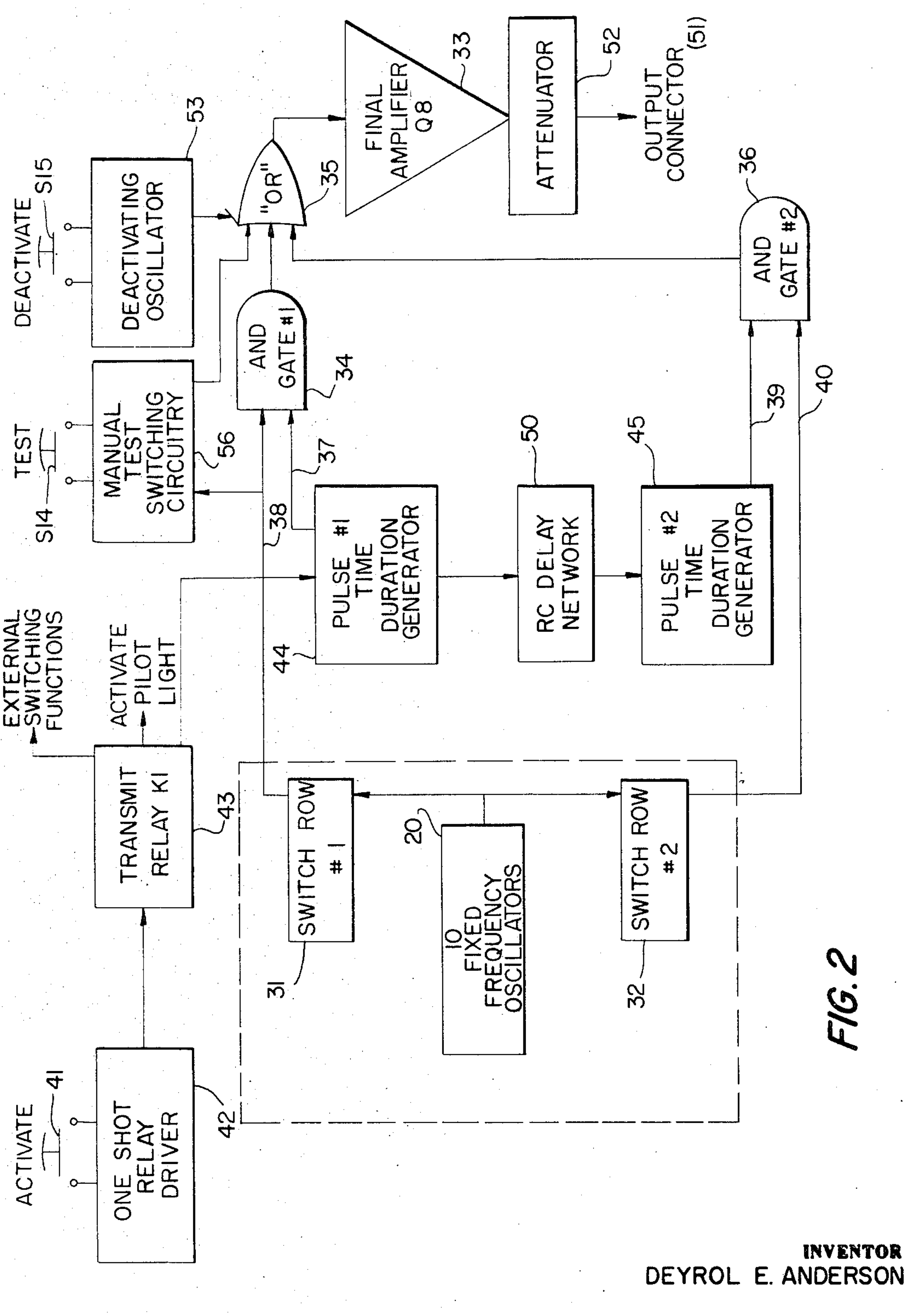
FIG. 2 is a block diagram of the encoder.
Figure 3:
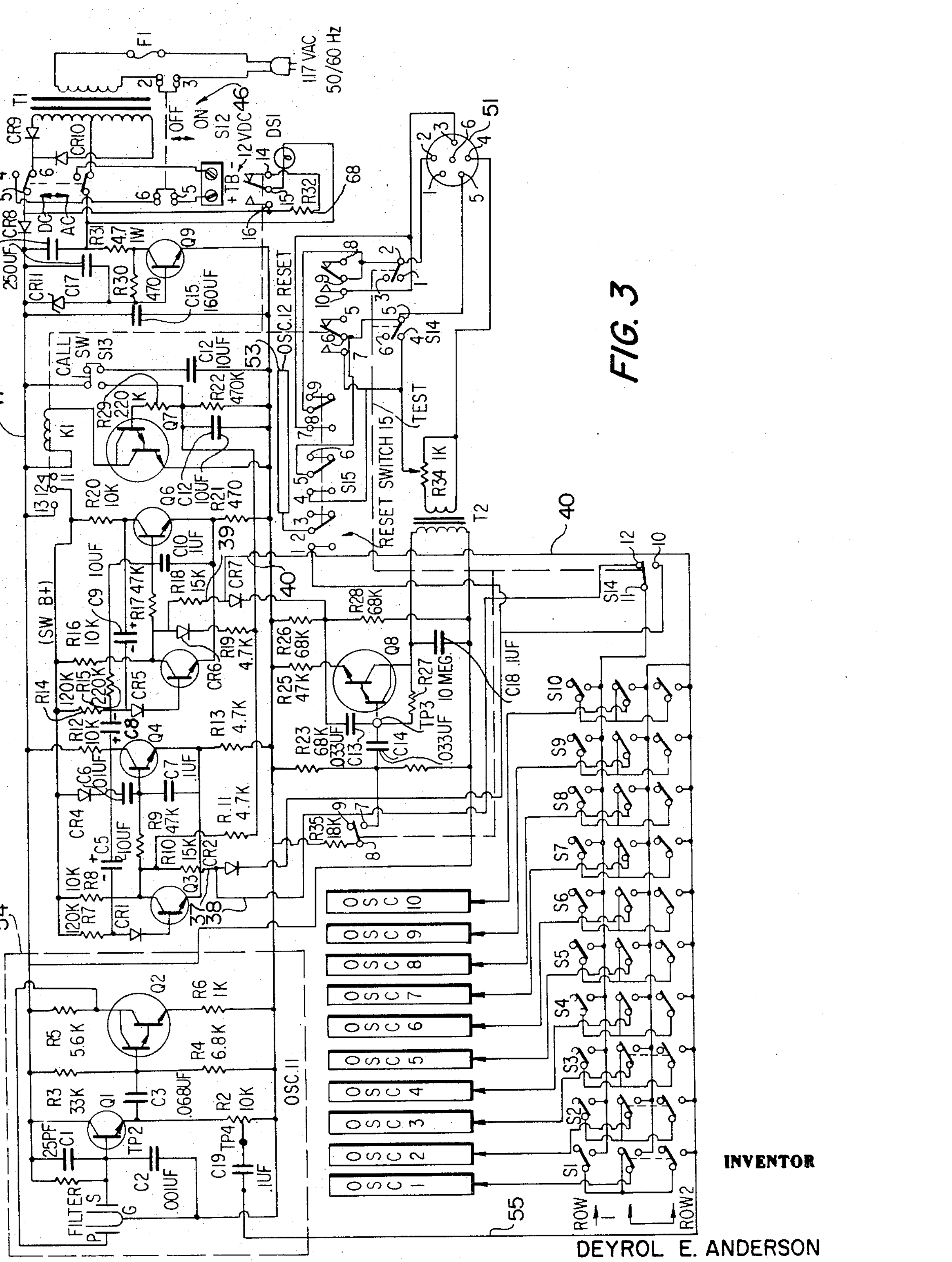
FIG. 3 is a schematic diagram of the encoder of FIG. 2.

The organization and method of operation of the encoder 16 may be understood by reference to the operational block diagram (FIG. 2) and the corresponding schematic diagram thereof (FIG. 3). The outputs of 10 fixed frequency oscillators 20 are fed to two banks of switches. For convenience one bank of switches is identified as switch row No. 1 and identified by reference character 31 and the other bank of switches is identified as switch row No. 2 and identified by reference character 32. Each switch row includes manually operable switch member sets S1–S10 one of each being connected to the output of an associated tone oscillator. Switch row No. 1 comprises ten single pole switches connected in a normally open position and adapted to set up the first digit of the two digit tone code signal. Switch row No. 2 comprises ten double pole switches connected to set up the second digit of the two-tone signal.

Tone selection is established by manually operating the appropriate pushbutton actuators (not shown) for the switches in each row. For example, actuation of switch S1 in bank 31 connects oscillator 1 to the final amplifier 33 through AND gate 34 and OR gate 35, while actuation of switch S1 in bank 32 connects oscillator 1 to the final amplifier 33 through AND gate 36 and OR gate 35.

AND gates 34 and 36 and OR gate 35 shown in the block diagram of FIG. 2 represent certain circuit functions embodied in the pulse generator circuit. A separate active AND and OR circuit as commonly understood does not exist, and the block diagram representation of the circuit functions is utilized to clarify the theory of operation of the circuit. For example, AND gate 34 corresponds to diode CR2, the two inputs being applied along lines 37 and 38. AND gate 36 corresponds to diode CR7, the two inputs being applied along lines 39 and 40.

Actuation of one of the switches in the switch banks 31 or 32 enables the appropriate AND gate, and transmission of the coded signal is accomplished by activation of the call switch 41 (S13). Closure of the normally open contacts of the call switch turns on the one shot relay driver transistor 42 (Q7), the output of which energizes the operating coil of a four pole transmit relay 43 (K1). One set of operating contacts (12–13) of relay K1 upon energization thereof connect the B+ bus of the first and second pulse time duration generator 44 and 45 to the output of the power supply and regulator 46 taken from line 47. Another set of operating contacts (14, 15, 16) of relay K1 connects the activate pilot light (DS1) into its energizing circuit, while the remaining sets of relay contacts establish various output connector contacts.

Upon connection of the time duration generator circuit 44 to power line 47, the generator comprising transistors Q3 and Q4 and their associated components begin timing. An output pulse is applied immediately at line 37 to the anode electrode of CR2. If one of the switches in bank 31 is closed, the input requirements of AND gate 34 are satisfied so as to connect the output of bank 31 to the input of transistor Q8 which forms with its related circuit components the final amplifier 33.

Pulse time duration generator 44 is connected to the second pulse duration generator 45 via an RC time delay network 50. The end of pulse "one" eventually initiates the beginning of pulse "two," however, network 50 consisting of capacitor C8 and resistor R15 delays the beginning of pulse "two." Generator 45 consists of transistors Q5 and Q6 and their associated components. When the second pulse time duration generator 45 begins timing, the output at line 39 satisfies the requirements of AND gate 36, consequently connecting the output of switch bank 32 to the final amplifier 33. The output of amplifier 33 is coupled to terminals 4 and 5 of an output connection jack 51 via output transformer T2 and attenuation network 52 comprising resistor R34 and the secondary winding of the coupling transformer. At this point, a two-tone activating signal is coupled through a suitable plug connection to a mixer circuit in the transmitter (not shown) to modulate the aural carrier. Each pulse is about 1 second in duration and a blank period of approximately 200 milliseconds is injected between the two pulses.

The deactivating signal is provided by a separate oscillator 53. Upon actuation of reset switch S15, the output of oscillator 53 is connected through the final amplifier to provide a single-tone deactivating signal. The duration of this signal is manually controlled by the operator and must be present for at least three seconds. Since this is not a selective code signal, any remote video tape recorder previously activated by the tone code signals, is deactivated by the single-tone deactivating signal.

The foregoing operation applies only when a different tone is selected for each of the tone pulses. For example, where switch S1 is actuated in bank 31 and switch S2 is actuated in bank 32, the output tone corresponds in frequency to that of oscillator 1 and oscillator 2. Where the tones selected for each pulse are the same, i.e., S1 is actuated in both banks, the output of an eleventh oscillator 54 is fed through switch banks 32 and 31 via line 55 to AND gate input line 38 of AND gate 34. Oscillator 54 consists of transistors Q1, Q2, a resonating filter and the associated components illustrated with the dash outline in FIG. 3. The output of the selected fixed frequency oscillator is now applied through the top contacts of the switch S1 of bank 32, as viewed in the drawing, to input line 40 of AND gate 36. All other functions take place exactly as described above. The result is that the 11th tone from oscillator 54 is always transmitted as the first pulse, regardless of the dual number selected, so long as both switches associated with the same oscillator are actuated.

A test switch circuit 56 (S14) is provided in order to continuously transmit any given oscillator frequency. Switch S14 when actuated connects the oscillator selected by any actuated switch in bank 31 to the input of the final amplifier 33.

Each oscillator is set to operate at its own frequency so that by the various possible combinations of oscillators up to 100 different two-tone code signals may be provided. The following frequency vs code table chart lists the preferred operating frequencies of the various oscillators including the 11th or A oscillator 54 and the reset or deactivating oscillator 53.

Frequency vs Code Table

| Code | Series C Freq. (Hz) |
|---|---|
| 0 | 321.7 |
| 1 | 339.6 |
| 2 | 358.6 |
| 3 | 378.6 |
| 4 | 399.8 |

| | |
|---|---|
| 5 | 422.1 |
| 6 | 445.7 |
| 7 | 470.5 |
| 8 | 496.8 |
| 9 | 524.6 |
| A | 569.1 |
| Reset | 598.0 |

As hereinbefore noted, the aural carrier is transmitted from the TV station antenna 11 and received by one or more remote TV monitor receivers 18, only one of which is shown. In accordance with the present invention, each monitor 18 is connected to a decoder 17 which is assigned a particular code group designation and is adapted to handle a plurality of codes. The number of codes depends to a large extent on an electro-mechanical frequency detector and particularly on the number of resonant reeds associated therewith. With a five reed detector, each decoder can be programmed to respond to any of twenty two-tone sequential codes. Each reed is resonant to a particular frequency corresponding to one of the oscillator frequencies of the encoder. The following table lists ten possible code groups using only eleven resonant reed members and listed below the chart is a tabulation of the total number of possible call codes Code Groups

| Code Group | 1st Freq. | 2nd Freq. | 3rd Freq. | 4th Freq. | 5th Freq. | Reset Freq. |
|---|---|---|---|---|---|---|
| 01234 | 321.7 | 339.6 | 358.6 | 378.6 | 399.8 | 598.0 |
| 56789 | 422.1 | 445.7 | 470.5 | 496.8 | 524.6 | 598.0 |
| 01256 | 321.7 | 330.9 | 358.6 | 422.1 | 445.7 | 598.0 |
| 01278 | 321.7 | 339.6 | 358.6 | 470.5 | 496.8 | 598.0 |
| 34567 | 378.6 | 399.8 | 422.1 | 445.7 | 470.5 | 598.0 |
| 34789 | 378.6 | 399.8 | 470.5 | 496.8 | 524.6 | 598.0 |
| 01289 | 321.7 | 339.6 | 358.6 | 496.8 | 524.6 | 598.0 |
| 0123A | 321.7 | 339.6 | 358.6 | 378.6 | 569.1 | 598.0 |
| 3456A | 378.6 | 399.8 | 422.1 | 445.7 | 569.1 | 598.0 |
| 6789A | 445.7 | 470.5 | 496.8 | 524.6 | 569.1 | 598.0 |

Decoder Code Groups - vs - Code Response

| −01234 | −56789 | −01256 | −01278 | −34567 |
|---|---|---|---|---|
| 01 | 56 | 05 | 07 | 35 |
| 02 | 57 | 06 | 08 | 36 |
| 03 | 58 | 15 | 17 | 37 |
| 04 | 59 | 16 | 18 | 45 |
| 10 | 65 | 25 | 27 | 46 |
| 12 | 67 | 26 | 28 | 47 |
| 13 | 68 | 50 | 70 | 53 |
| 14 | 69 | 51 | 71 | 54 |
| 20 | 75 | 52 | 72 | 63 |
| 21 | 76 | 60 | 80 | 64 |
| 23 | 78 | 61 | 81 | 73 |
| 24 | 79 | 62 | 82 | 74 |
| 30 | 85 | 52 | 64 | 76 |
| 31 | 86 | Codes | Codes | Codes |
| 32 | 87 | | | |
| 34 | 89 | | | |
| 40 | 95 | | | |
| 41 | 96 | | | |
| 42 | 97 | | | |
| 43 | 98 | | | |
| 20 | 40 | | | |
| Codes | Codes | | | |

| −34789 | −01289 | 0123A* | 3456A* | 6789A* |
|---|---|---|---|---|
| 38 | 09 | 00 | 44 | 77 |
| 39 | 19 | 11 | 55 | 88 |
| 48 | 29 | 22 | 66 | 99 |
| 49 | 90 | 33 | 97 | 100 |
| 83 | 91 | 94 | Codes | Codes |
| 84 | 92 | Codes | | |
| 93 | 90 | | | |
| 94 | Codes | | | |
| 84 | | | | |
| Codes | | | | |

*Note: Code 00 is transmitted as A0, 11 as A1, etc.

As should be apparent from the latter chart and tabulation, a decoder using code group number 01234 can handle up to 20 codes. A system employing both 01234 and 56789 decoders can accomodate up to 40 codes and by varying the combinations of the basic ten reeds up to 100 call codes can be used.

Figure 4:
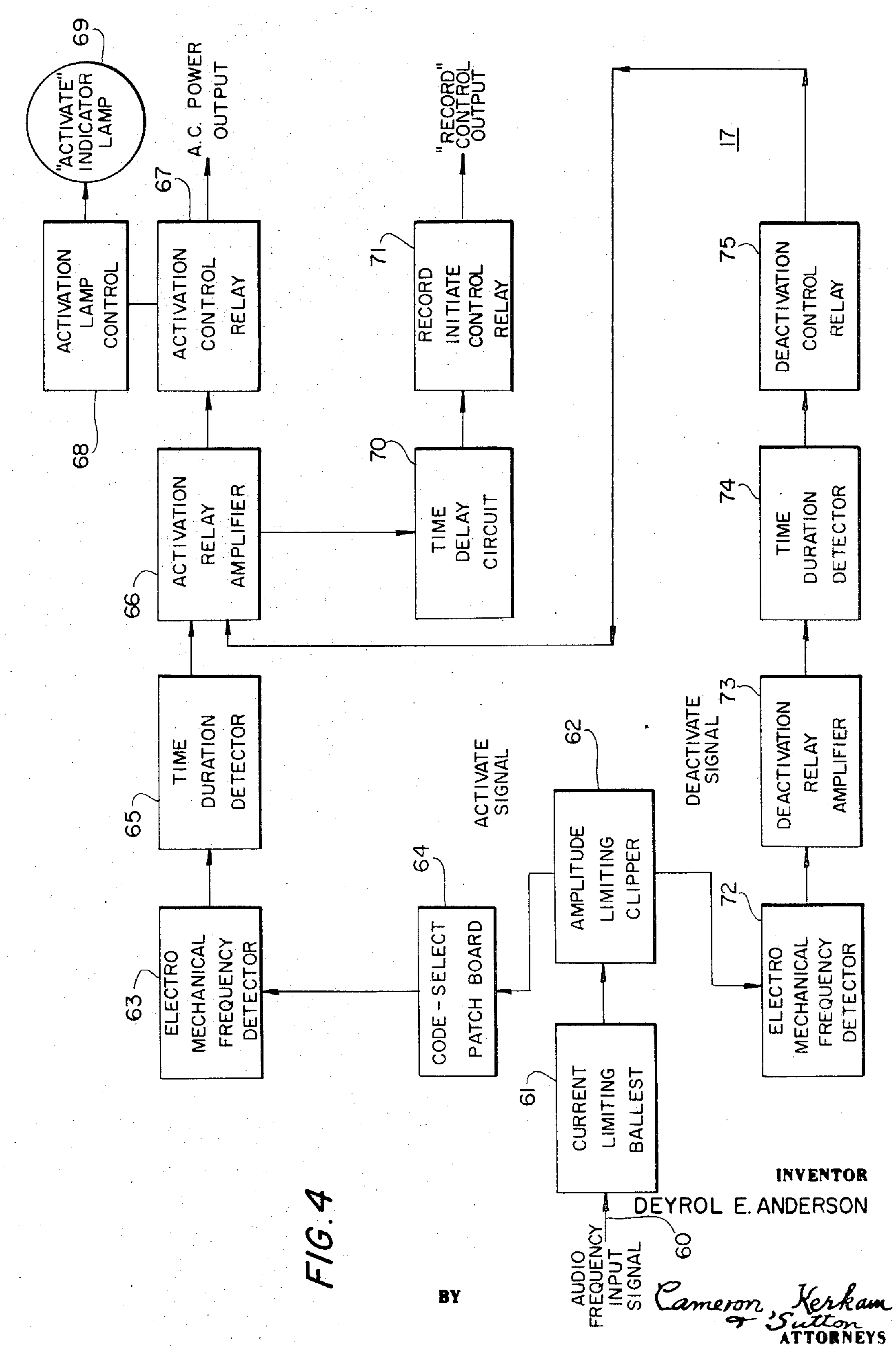
FIG. 4 is a block diagram of the decoder.

Referring now to FIG. 4, there is illustrated a block diagram of the decoder 17 which is adapted to receive an audio frequency input on line 60 from the receiver 18. The video output of the receiver is connected directly to the video tape recorder 19. The audio signal goes through a current limiting ballast 61 and amplitude limiting clipper 62 after which it is applied in parallel to two channels. Each channel includes an electro-mechanical frequency detector that controls the activation and deactivation of the associated video tape recorder. The activate signal from clipper 62 is applied to a five reed electro-mechanical frequency detector 63. A code select patch board 64 allows the decoder to be programmed for any particular code. Once the code is established and the patch board set accordingly, the decoder is set to respond to a particular call code.

Since the decoder of the present invention operates on a two frequency or two-tone detection basis, detector 63 only determines that the proper frequency of transmission has been received. A time duration detector 65 assures that the second frequency is received within a specific period of time in order to validate the code. A valid activating signal is then applied to the output control circuits comprising an activation relay amplifier 66 adapted to activate a control relay 67. The contacts of relay 67 upon energization thereof apply AC voltage to a power socket J2 (see FIG. 6) located on the decoder 17. Video tape recorder 19 has its power plug (not shown) plugged into power socket J2 so as to be energized upon activation of the control relay. When the relay 67 is energized, an activation lamp control 68, consisting of an SCR circuit, energizes an "activate" indicator light 69. This light remains lit until manually reset.

No matter how many times a decoder is repeatedly activated, the light 69 is energized during the first activation and requires manual resetting to extinguish it. Activation relay amplifier 66 also energizes a time delay circuit 70 which in turn energizes a record initiate control relay 71 after a short time delay established by an RC circuit. Contacts of this relay are brought out to a record control connector and are used to energize a record control solenoid on video tape recorder 19. The purpose of this function is to establish a time delay between video tape recorder power switch-on and record-function-activation. This allows the rotating recording head of the recorder to reach its proper operating speed. At this point, the decoder has responded to the proper audio frequency code signal and has activated the video tape recorder.

The deactivation of the video tape recorder is controlled by the deactivate single-tone signal applied to detector 72. The deactivation electro-mechanical frequency detector 72 responds to a single audio frequency of 598.0 Hz. The particular frequency is amplified by a deactivation relay amplifier 73 and is fed to a time duration detector 74. This circuit consists of an RC time constant which begins timing upon receipt of the deactivation frequency. If that frequency occurs for a specific length of time, then the deactivation control relay 75 is energized. Relay 75 in turn de-energizes the activation control relay 66 and the record initiate control relay 71 resulting in the turn-off of the video tape recorder.

In summary, a two-frequency activation signal is detected by the decoder and results in: first, the AC power socket J2 being energized and the activate indicator lamp 69 being lit; and secondly, the record control output is energized approximately 5 seconds later. A single deactivate tone signal turns off the video tape recorder, providing the deactivate signal has occurred for a sufficient length of time which, as noted, is approximately 3 seconds.

Figure 5:
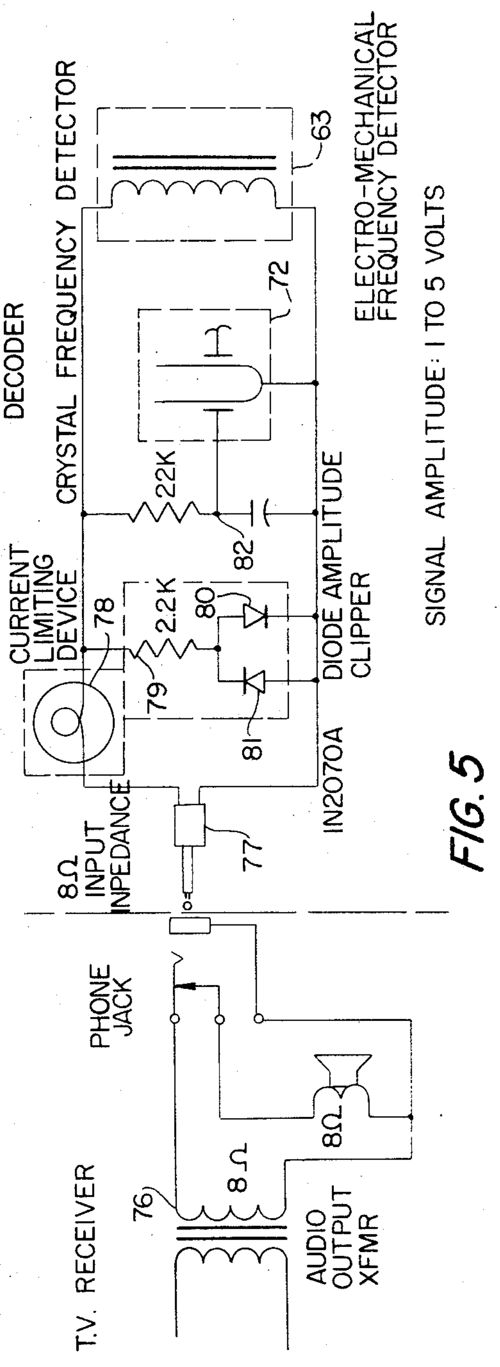
FIG. 5 is a block diagram of the decoder input interface.

Referring now to FIG. 5, there is illustrated the decoder input interface circuits. An audio output from the TV monitor receiver is taken directly off the secondary of the audio output transformer 76 by means of a shorting jack 77. Jack 77 is serially connected to an incandescent lamp filament 78 which serves as a current limiting ballast. The output from the ballast is clipped in clipper 62 consisting of resistor 79 and positive and negative clipping diodes 80 and 81. The clipped signal is fed in parallel to two channels for detection by two electro-mechanical frequency detecting devices 63 and 72. Detector 63 is essentially an iron core coil as seen by the signal and is arranged to detect two discrete frequencies corresponding to an activate signal. Detector 72 is a crystal tuning fork having its input electrode connected to the junction 82 of an RC network which is in turn connected across the output of the clipper circuit 62. The crystal detector 72 is sensitive to a single frequency of 598.0 Hz and is used for detection of the deactivate signal.

Figure 6:
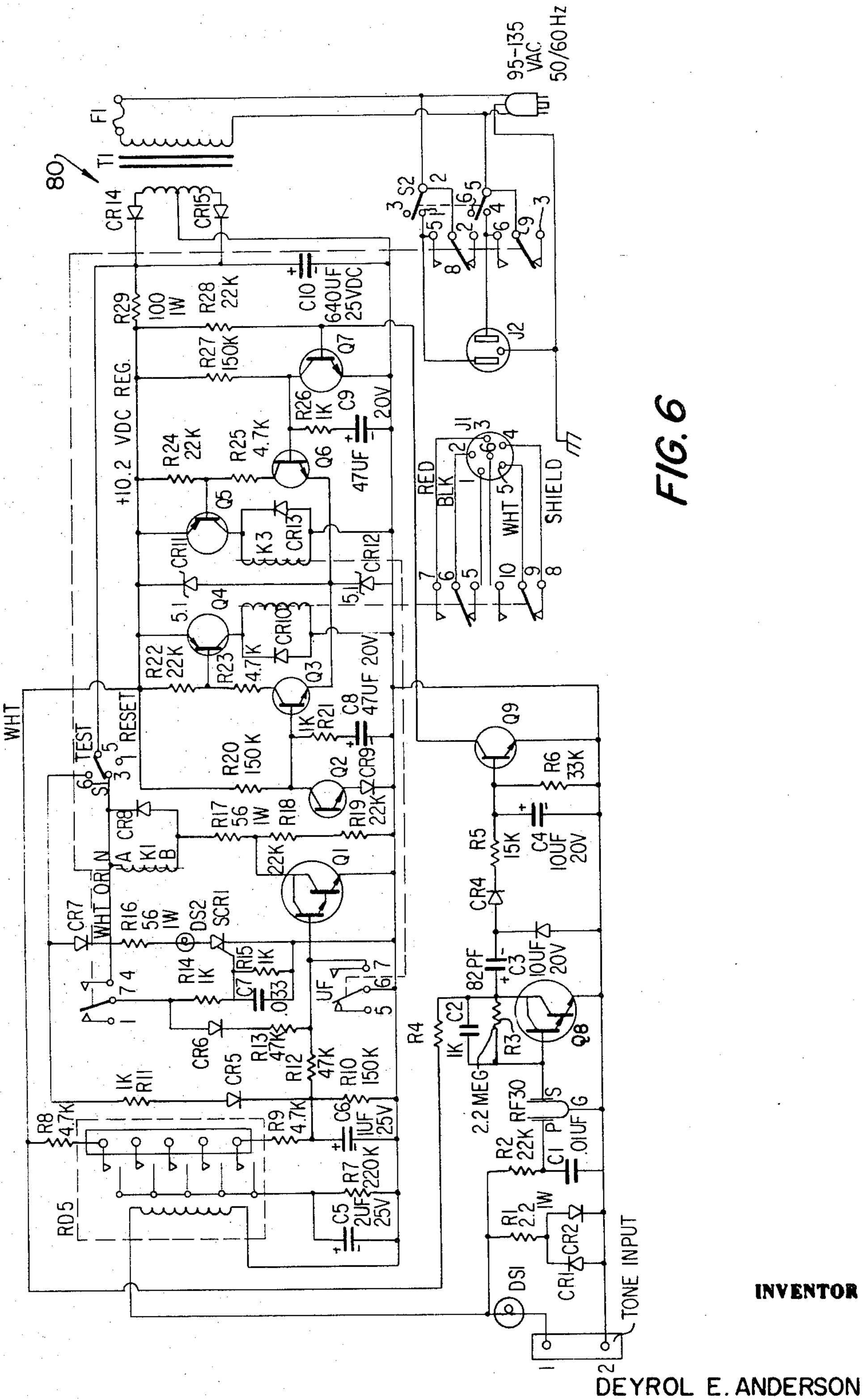
FIG. 6 is a schematic diagram of the decoder of FIG. 4.

The particular circuits of the decoder as related to the input interface are shown in FIG. 6 to which reference should be made for a complete understanding of the decoder. The audio frequency input signal is fed in from jack 70 through the terminals of a tone input terminal board disposed on the decoder. The upper terminal, as viewed in the drawing, is connected to the incandescent ballast element 78 (DS1) which serves to limit input current. The input signal is thereafter amplitude clipped by diode pair 80 (CR2) and 81 (CR1) and impressed across the two electromechanical frequency detection devices 72 (RF30) and 63 (RD5).

Detector 63 is a five reed frequency sensitive element. Each reed is resonant at a specific frequency so that the detector is capable of detecting five discrete audio frequency signals preferably between the range of 321.7 Hz and 569.1 Hz and can be set to respond to any of 20 call codes. As shown in the drawing, the reeds of detector 63 have been designated by way of example as the 01234 code group. Accordingly, the reeds are resonant, from top to bottom, at 321.7 Hz; 339.6 Hz; 358.6 Hz; 378.6 Hz; and 399.8 Hz. The fixed contacts of the detector 63 form the code select path board 64. Two of the contacts are connected via patch cords or jumpers to the free end of resistors R8 and R9 to establish the desired call code. In the illustrated embodiment, the two-tone sequential call code is 04 (321.7 Hz followed by 399.8 Hz) since the 0 terminal and 4 terminal are connected to R8 and R9, respectively.

In operation, upon receipt of a 321.7 Hz signal, reed 0 oscillates causing capacitor C5 to charge through R8 from the B+ source. Capacitors C5 and C6 and resistors R7, R8 and R9 form the time duration detector circuit 65. C5 will charge toward B+ whenever the reed contact is made due to the presence of the first pulse. The charging voltage will be a square wave signal. If the input signal is present for one second, C5 will be fully charged. After a period of 200 milliseconds, a second 1 second duration radio signal of 399.8 Hz causes reed 4 to vibrate and discharge C5 through R9 and R10. C9 is charged to the voltage initially across C5 and provides a change in voltage at the junction of R10 and R12 which drives the base of transistor $Q_1$ more positive.

Transistor $Q_1$ and its associated components form the activation relay amplifier 66. Connected in the collector circuit of transistor $Q_1$ is the energizing coil of the activation control relay 67 (K1). Relay 67 comprises 3 poles or sets of contacts and its energizing winding is energized upon conduction of $Q_1$ from the B+ supply 80 through the reset position of switch S1 and resistor R17. When K1 pulls in, two sets of contacts connect the terminals of the power socket J2 across the AC input lines to establish power to the video tape recorder which has its power input plug connected to jack J2. The third set of contacts establishes the gating circuit for the SCR activation light control 68. SCR1 fires causing lamp 69 (DS2) to be lit. Proper gating voltage is developed across the voltage divider comprising resistors R14 and R15. Capacitor C7 damps out any variations.

It should be noted that simultaneously with the switching of the last set of contacts to gate SCR1, the bias circuit is established for transistor $Q_1$. The proper turn-on voltage for $Q_1$ is determined by the voltage divider net-work R13, R12 and R10; the junction of R13, R12 being connected to the input of the Darlington configuration $Q_1$. When $Q_1$ is turned on, the time delay circuit 70 consisting of transistors $Q_2$, $Q_3$ and $Q_4$ and their associated components, is activated. Drive transistor $Q_4$ has connected in its collector circuit the energizing winding of the record initiate control relay 71 (K2). The contacts of relay 71 are connected to the record control connector J1 to which is plugged the video tape recorder record control jack (not shown). Switching of the relay contacts of relay 71 serves to energize the record control solenoid on the recorder after a short delay. The delay allows the rotating recording head to reach its proper operating speed. The delay is established by the series RC network consisting of resistor R21 and capacitor C8 connected to the collector -base junction of transistors $Q_2$ and $Q_3$.

The deactivation channel includes detector 72 (RF30) which is capable of detecting a single frequency of 598.0 Hz. The output of detector 72 drives the deactivation relay amplifier 73 consisting of transistors $Q_8$ and $Q_9$. The amplified tone signal is fed to time duration detector 74 consisting of transistor $Q_7$, $Q_6$ and $Q_5$. An RC network R26 and C9 establishes the desired time delay. The circuit begins timing upon receipt of the deactivation signal. If the signal is present for approximately three seconds, $Q_5$ is turned on energizing the deactivation control relay 75 (K3). The contacts of relay 75 are connected in the base circuit of transistor $Q_1$ and ground the base when relay 75 is energized to turn off or inhibit amplifier 66 upon the presence of a deactivation signal.

Although the invention has been described with reference to particular embodiments and applications, many changes and modifications will be apparent to those skilled in the art without departing from the full scope and true spirit of the invention as defined by the appended claims, and it is therefore intended to cover all such changes and modifications.

I claim:

1. An instructional television system for making available non-print learning materials from a central library store of programs of learning materials, means for transmitting selected programs via a television transmitter link, means for addressing said selected programs with a predetermined call code signal comprising at least two sequential tone pulses each having a discrete frequency and being of a specific duration with adjacent tone pulses being separated by a preselected time interval in which no tone generated signals are present and a single tone deactivation code signal, a plurality of subscriber stations each including a television monitor receiver for receiving the transmitted programs, a decoder connected to each receiver and a video tape recorder for selectively recording transmitted programs, each decoder at a subscriber station being programmed to detect one of a plurality of said call code signals and including first means for activating an associated video tape recorder to record the selected transmitted material in response to a detected call code signal at that decoder and second means for deactivating the associated video tape recorder in response to the detection of said single tone deactivation code signal at that decoder, each said decoder including a pair of electro-mechanical frequency detectors, one of said detectors being programmed to respond to the sequential tone pulses of a call code signal, the other of said detectors being responsive to said single tone deactivation code signal, and said first means for activating an associated recorder includes a first relay control connected to the programmed detector and having a first set of contacts adapted to establish an energizing circuit for activation of said video tape recorder upon the detection of said call code signal and a delay circuit for delaying the record function of said video tape recorder a predetermined period, said second means for deactivating the recorder including a second relay control connected to the other of said detectors and having a set of contacts connected in the first relay control and adapted to disable said first relay control in response to the detection of said single tone deactivation code.

2. An instructional television system as set forth in claim 1 wherein said first means further includes a time duration detector circuit adapted to measure the time interval between sequential pulses and means operatively connecting said circuit to said first relay control, and said second means further includes a time duration detector circuit adapted to allow said second relay control to be energized only when said single tone deactivation code signal is present for a predetermined period.

3. An instructional television system as set forth in claim 1 wherein said call code signal comprises two individual tones, each tone being approximately one second in duration, said tones being spaced from each other in time by a period of approximately 200 milliseconds and said single tone deactivation signal having a duration of approximately three seconds.

4. An instruction television system as set forth in claim 1 further including a central store for storing the prerecorded instructional programs in the form of video tapes, means for selecting video tapes from said store and transmitting an instructional program prerecorded on the selected tape including encoder means for coding said transmitted program by modulating the aural carrier of the transmitter with a multi-tone activating call signal and a single tone deactivating signal.

5. An instructional, television system for transmitting via a television transmitting link prerecorded instructional programs from a central television transmitting station to be received at one or more remotely situated receiver stations comprising a central store having prerecorded instructional programs, means for selecting and transmitting an instructional program from said store including encoder means for addressing said transmitted program with an activating call signal comprising at least two sequential tone pulses each having a discrete frequency and being of a specific duration with adjacent tone pulses being separated by a preselected time interval in which no tone generated signals are present and a single tone deactivating signal, television receiver means disposed at each receiver station for receiving said coded transmitted program and separating said tone signals from the program information, a decoder means, operatively connected to each receiver to receive said separated signals each said decoder at a remote location being responsive to a unique call signal and to said single tone signal, a normally deactivated video tape recorder connected to each receiver means, for recording a transmitted program, said decoder including first means for activating said video tape recorder from the associated decoder in response to detection of the unique call signal at that decoder to enable recording of the transmitted program and second means for deactivating all said video tape recorders previously activated in response to detection of said single tone signal, each said decoder including means for connecting the input thereto to the audio output of the associated receiver and a pair of electromechanical frequency detectors, one of said detectors being programmed to respond to a multi-tone sequential call code, the other of said detectors being responsive to said single tone deactivation code, and said first means for activating an associated recorder includes a first relay control connected to the programmed detector and having a first set of contacts adapted to establish an energizing circuit for activation of said video tape recorder upon the detection of said two-tone sequential code, and said first means further including a delay circuit for delaying the record function of said video tape recorder a predetermined period, said second means for deactivating the recorder including a second relay control connected to the other of said detectors and having a set of contacts connected in the first relay control, said contacts being arranged to disable said first relay control in response to the detection of said single tone deactivation code, said first means further including a time duration detector circuit adapted to measure the time interval between sequential pulses, and means operatively connecting said circuit to said first relay control, and said second means further including a time duration circuit adapted to allow said second relay control to be enabled only when said single tone deactivation code signal is present for a predetermined period.

6. An instructional television system as set forth in claim 5 wherein said call code signal comprises two individual tones of a fixed duration and of a fixed frequency, each tone being approximately one second in duration, said tones being spaced from each other in time by a period of approximately 200 milliseconds, and said single tone deactivation signal is approximately three seconds in duration.

7. An instruction television system for transmitting prerecorded instructional programs from a central transmitting station to one or more remotely situated receiver stations comprising a central store for storing the prerecorded instructional programs in the form of video tapes, means for selecting video tapes from said store and transmitting an instructional program prerecorded on the selected tape including encoder means for coding said transmitted program by modulating the aural carrier of the transmitter with a multi-tone activating call signal and a single tone deactivating signal, said encoder including a plurality of oscillators selectably operable to provide the sequential tone signals, a first AND gate, a second AND gate, means connecting one input of said AND gates to said oscillators, a first timing circuit, a second timing circuit, a delay network interconnecting said timing circuits such that an output from the second timing circuit is initiated upon the completion of the timing of said first timing circuit, but with a delay dependent on said delay network and means connecting said first timing circuit to said first AND gate and said second timing circuit to said second AND gate, and means for connecting the outputs of said AND gates to said transmitter to modulate the aural carrier.

8. An instructional television system for making available non-print learning materials from a central library store of programs of learning materials, means for transmitting selected programs via a television transmitter link, means for addressing said selected programs with a predetermined call code signal comprising at least two sequential tone pulses each having a discrete frequency and being of a specific duration with adjacent tone pulses being separated by a preselected time interval in which no tone generated signals are present and a single tone deactivation code signal, a plurality of subscriber stations each including a television monitor receiver for receiving the transmitted programs, a decoder connected to each receiver and a video tape recorder for selectively recording transmitted programs, each decoder at a subscriber station being programmed to detect one of a plurality of said call code signals and including first means for activating an associated video tape recorder to record the selected transmitted material in response to a detected call code signal at that decoder and second means for deactivating the associated video tape recorder in response to the detection of said single tone deactivation code signal at that decoder, said means for transmitting including an encoder having a plurality of oscillators selectably operable to provide the sequential tone signals, a first AND gate, a second AND gate means connecting one input of said AND gates to said oscillators, a first timing circuit, a second timing circuit, a delay network interconnecting said timing circuit such that an output from the second timing circuit is initiated upon the completion of the timing of said first timing circuit, but with a delay dependent on said delay network and means connecting said first timing circuit to said first AND gate and said second timing circuit to said second AND gate, and means for connecting the outputs of said AND gates to said transmitter to modulate the aural carrier.

9. An instructional, television system for transmitting via a television transmitting link prerecorded instructional programs from a central television transmitting station to be received at one or more remotely situated receiver stations comprising a central store having prerecorded instructional programs, means for selecting and transmitting an instructional program from said store including encoder means for addressing said transmitted program with an activating call signal comprising at least two sequential tone pulses each having a discrete frequency and being of a specific duration with adjacent tone pulses being separated by a preselected time interval in which no tone generated signals are present and a single tone deactivating signal, television receiver means disposed at each receiver station for receiving said coded transmitted program and separating said tone signals from the program information, a decoder means, operatively connected to each receiver to receive said separated signals each said decoder at a remote location being responsive to a unique call signal and to said single tone signal, a normally deactivated video tape recorder connected to each receiver means, for recording a transmitted program, said decoder including first means for activating said video tape recorder from the associated decoder in response to detection of the unique call signal at that decoder to enable recording of the transmitted program and second means for deactivating all said video tape recorders previously activated in response to detection of said single tone signal, each encoder means including a plurality of oscillators selectably operable to provide the sequential tone signals, a first AND gate, a second AND gate means connecting one input of said AND gates to said oscillators, a first timing circuit, a second timing circuit, a delay network interconnecting said timing circuits such that an output from the second timing circuit is initiated upon the completion of the timing of said first timing circuit abut with a delay dependent on said delay network and means connecting said first timing circuit to said first AND gate and said second timing circuit to said second AND gate, and means for connecting the outputs of said AND gates to said transmitter to modulate the aural carrier.

10. An instructional television system for transmitting and receiving prerecorded instructional programs comprising a central television transmitting station for transmitting to one or more remotely situated receiver stations selectively precoded video programs coded with an activating call signal comprising at least two sequential tone pulses each having a discrete frequency and being of a specific duration with adjacent tone pulses being separated by a preselected time interval in which no tone generated signals are present and a single tone deactivating signal means for modulating the aural carrier of the television signal with the call signal television receiver means disposed at each receiver station for receiving the modulated aural carrier and video transmitted program and separating said tone signals from the modulated aural carrier and video program information, a decoder connected to each receiver means, each said decoder being responsive to a unique multi-tone call signal and all said decoders being responsive to said single tone signal, a normally deactivated video tape recorder separately connected to each receiver means and to each associated decoder, each said decoder including a pair of electro-mechanical frequency detectors, one of said detectors being programmed to respond to a call code signal, the other of said detectors being responsive to said single tone deactivating signal, first means for activating an associated recorder including a first relay control connected to the programmed detector and having a first set of contacts adapted to establish an energizing circuit for activation of said video tape recorder upon the detection of said two-tone sequential code, said first means further including a delay circuit for delaying the record function of said video tape recorder a predetermined period and second means for deactivating the recorder including a second relay control connected to the other of said detectors and having a set of contacts connected in the first relay control and adapted to disable said first relay control in response to the detection of said single tone deactivation code said first means having a time duration detector circuit adapted to measure the time interval between sequential pulses and means operatively connecting said circuit to said first relay control and said second means further including a time duration circuit adapted to allow said second relay control to be enabled only when said single tone deactivation code signal is present for a predetermined period of at least three seconds and said call code signal comprises individual tones of a fixed duration and of a fixed frequency, each said individual approximately one second in duration, and spaced from each other in time by a period of approximately 200 milliseconds.

* * * * *